US008948194B2

(12) United States Patent
Gao et al.

(10) Patent No.: US 8,948,194 B2
(45) Date of Patent: Feb. 3, 2015

(54) METHOD FOR RECEIVING MULTICAST CONTROL CHANNEL CHANGE NOTIFICATION AND USER EQUIPMENT

(75) Inventors: Youjun Gao, Beijing (CN); Zhenping Hu, Beijing (CN); Ning Yang, Beijing (CN); Chunfeng Cui, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 360 days.

(21) Appl. No.: 13/390,516

(22) PCT Filed: Aug. 13, 2010

(86) PCT No.: PCT/CN2010/001233
§ 371 (c)(1),
(2), (4) Date: May 29, 2012

(87) PCT Pub. No.: WO2011/017912
PCT Pub. Date: Feb. 17, 2011

(65) Prior Publication Data
US 2012/0230347 A1  Sep. 13, 2012

(30) Foreign Application Priority Data

Aug. 14, 2009  (CN) .......................... 2009 1 0168209
Sep. 11, 2009  (CN) .......................... 2009 1 0169967

(51) Int. Cl.
*H04J 3/26* (2006.01)
*H04W 72/00* (2009.01)
*H04W 72/04* (2009.01)

(52) U.S. Cl.
CPC .......... *H04W 72/005* (2013.01); *H04W 72/042* (2013.01)
USPC ........... 370/432; 370/312; 370/329; 370/235; 455/404.1; 455/132; 455/460

(58) Field of Classification Search
CPC .................................................. H04W 72/005
USPC ............... 370/312, 329, 235, 432; 455/404.1, 455/3.01, 132, 422.1, 460
See application file for complete search history.

(56) References Cited

U.S. PATENT DOCUMENTS 7,450,933 B2 * 11/2008 Kwak et al. ................. 455/414.1
7,546,132 B2 *  6/2009 Lee et al. ..................... 455/503

(Continued)

FOREIGN PATENT DOCUMENTS

| CN | 1476198 A | 2/2004 |
| CN | 1947449 A | 4/2007 |
| CN | 101163331 A | 4/2008 |

OTHER PUBLICATIONS

PCT International Search Report for PCT Counterpart Application No. PCT/CN2010/001233 containing Communication relating to the Results of the International Search Report, 6 pgs., (Nov. 25, 2010).

(Continued)

*Primary Examiner* — Andrew Lai
*Assistant Examiner* — Andrew C Lee
(74) *Attorney, Agent, or Firm* — Blakely, Sokoloff, Taylor & Zafman LLP

(57) ABSTRACT

The embodiments of the present invention disclose a method and user terminal for receiving multicast control channel (MCCH) change notifications, which include: obtaining the transmission time of an MCCH change notification; and when the MCCH change notification is not received during one MCCH modification period, receiving, according to the transmission time of the MCCH change notification, the MCCH change notification at least N times, wherein N is the preset reception times of the MCCH change notification. In the present invention, the efficiency of receiving MCCH change notifications by user terminals is improved, and the probability of processing MCCH change notifications falsely due to too many network identifiers in a physical downlink control channel (PDCCH) is reduced.

27 Claims, 5 Drawing Sheets

(56) References Cited

U.S. PATENT DOCUMENTS

| | | | |
|---|---|---|---|
| 7,558,228 B2* | 7/2009 | Lee et al. | 370/312 |
| 7,821,979 B2* | 10/2010 | Lee et al. | 370/312 |
| 8,144,735 B2* | 3/2012 | Vayanos et al. | 370/522 |
| 8,311,563 B2* | 11/2012 | Lee et al. | 455/503 |
| 2006/0030342 A1* | 2/2006 | Hwang et al. | 455/466 |
| 2006/0067361 A1* | 3/2006 | Lee et al. | 370/466 |
| 2006/0146858 A1* | 7/2006 | Kim | 370/432 |
| 2008/0045224 A1* | 2/2008 | Lu et al. | 455/446 |
| 2008/0291866 A1* | 11/2008 | Fukui | 370/328 |
| 2008/0318566 A1* | 12/2008 | Chun et al. | 455/422.1 |
| 2009/0116418 A1* | 5/2009 | Lee et al. | 370/312 |
| 2009/0253401 A1* | 10/2009 | Lee et al. | 455/404.1 |
| 2010/0046451 A1* | 2/2010 | Tada et al. | 370/329 |
| 2010/0165901 A1* | 7/2010 | Kim | 370/312 |

OTHER PUBLICATIONS

PCT Written Opinion of the International Searching Authority for PCT Counterpart Application No. PCT/CN2010/001233, 10 pgs., (Nov. 25, 2010).

PCT Notification concerning Transmittal of International Preliminary Report on Patentability (Chapter I of the Patent Cooperation Treaty) for PCT Counterpart Application No. PCT/CN2010/001233, 13 pgs., (Feb. 23, 2012).

* cited by examiner

METHOD FOR RECEIVING MULTICAST CONTROL CHANNEL CHANGE NOTIFICATION AND USER EQUIPMENT

CROSS REFERENCE TO RELATED APPLICATIONS

The present application is a US National Stage of International Application No. PCT/CN2010/001233, filed 13 Aug. 2010, designating the United States, and claiming priority to Chinese Patent Application No. 200910168209.8 filed 14 Aug. 2009 and Chinese Patent Application No. 200910169967.1 filed 11 Sep. 2009.

FIELD OF THE INVENTION

The present invention relates to the field of communications and particularly to a method for receiving a multicast control channel change notification and a user equipment.

BACKGROUND OF THE INVENTION

A Multicast Control Channel (MCCH) is a point-to-multipoint downlink channel in an Evolved Multimedia Broadcast and Multicast Service (eMBMS, also referred to as Long Term Evolution (LTE) MBMS) system over which control information generally including eMBMS service information and radio bearer related information is transmitted from the network side to a User Equipment (UE), where the eMBMS service information indicates eMBMS services available in a cell where the user equipment is located, and for each eMBMS service, the eMBMS service information may include a service ID (a service identifier), a session ID (a session identifier), a radio bearer releasing indicator and other information; and for one or more eMBMS services, the radio bearer related information describes information on a radio bearer and a point-to-multipoint bearer used in a served cell, and for each eMBMS service, the radio bearer related information may include the service ID, physical channel information, transmission channel information, and radio bearer information.

Position information of an MCCH is indicated from the network side over a Broadcast Control Channel (BCCH), and different user equipments correspond to different position information so that the user equipments can fetch information transmitted over the MCCHs at indicated positions and access corresponding services according to control information carried over the MCCHs.

A modification period and a repetition period are defined for an MCCH. The modification period is an integer multiple of the repetition period, and in each modification period, contents over the MCCH are transmitted repeatedly at an interval of the repetition period and are unchangeable in the modification period. Stated otherwise, if information carried over an MCCH is changed, the changed information can be transmitted only after the next modification period is started. Since contents carried over an MCCH in the same modification period are transmitted repeatedly at an interval of a repetition period, a UE will not continue with monitoring any more information transmitted over the MCCH after fetching the information over the MCCH in the same modification period.

When information carried over an MCCH is changed, for example, when an eMBMS service is changed, or radio bearer information is changed, a user equipment has to be indicated from the network side to acquire the new changed information carried over the MCCH in time, that is, an MCCH change notification has to be transmitted from the network side to the user equipment, and the user equipment will monitor the MCCH and acquire the new changed information upon reception of the MCCH change notification.

In the prior art, an MCCH change notification is transmitted from the network side to a user equipment in the following two methods.

In a first method of the prior art, an MCCH change notification is carried in a paging information packet transmitted to a user equipment.

Specifically, in the prior art, user equipments in an eMBMS system include user equipments receiving an eMBMS service and user equipments receiving only a unicast service, both types of user equipments monitor paging information in their own paging periods. When the information carried over an MCCH is changed, a paging message including an MCCH change notification indication is transmitted from the network side to the user equipments, and a P-RNTI corresponding to the paging message is transmitted over a corresponding Physical Downlink Control Channel (PDCCH); and the user equipments can receive the paging message upon detection of the P-RNTI, parse the paging message according to the P-RNTI, acquire the MCCH change notification and fetch the changed information carried over the MCCH according to the MCCH change notification.

For example, if the modification period of the MCCH is 10240 milliseconds (ms) and the paging period of a specific user equipment is 320 ms, that is, the user equipment receives the paging information in a period of 320 ms, a modification period includes 32 paging periods in which an MCCH change can be notified.

However, since the MCCH change notification is transmitted to all the user equipments in the eMBMS system, that is, the user equipments receiving an eMBMS service can not be distinguished at the network side from the user equipments receiving only a unicast service, the user equipments receiving only a unicast service will also parse the paging information packet including the MCCH change notification upon detection of the P-RNTI, as a result of which it is possible that the paging information packet is not a true paging packet but just a paging information packet including the MCCH change notification which is not required for the user equipments receiving only a unicast service, so this method may degrade the performance of the user equipments receiving only a unicast service.

In a second method of the prior art, an MCCH change notification is carried over a PDCCH.

When information carried over an MCCH is changed, a specific Radio Network Temporary Identifier (RNTI), e.g., a Multimedia-Radio Network Temporary Identifier (M-RNTI), may be transmitted at a paging occasion from the network side over a PDCCH. A user equipment receiving an eMBMS service becomes awake in its own paging period and monitors the specific RNTI (e.g., M-RNTI) over the PDCCH. If it is detected that the M-RNTI is carried over the PDCCH, it indicates that the information over the MCCH is changed, and the user equipment will further monitor the MCCH and acquire the new information.

However, there is a limited space over the PDCCH, and when the specific RNTI is transmitted at a paging occasion of the user equipment from the network side to the user equipment along with other network identifiers, e.g., an RA-RNTI, an SI-RNTI, and a P-RNTI, the PDCCH may be congested by the information so that the specific RNTI may be processed in error and thus fail to be detected correctly by the user equipment and consequently the user equipment may miss the modified contents over the MCCH and fail to receive correctly an e-MBMS service. Furthermore, since a paging occasion may vary from one user equipment to another, a base station has to transmit a specific RNTI frequently and repeatedly, thus making the notification inefficient.

SUMMARY OF THE INVENTION

Embodiments of the invention provide a method for receiving a multicast control channel change notification and a user equipment to improve the efficiency with which the user equipment receives an MCCH change notification, to lower the probability that the performance of a system is degraded due to an excessive number of network identifiers over a PDCCH or the MCCH change notification fails to be received correctly due to a channel condition, and to enable the user equipment to acquire modified contents over an MCCH in time.

Embodiments of the invention further provide a method and device for transmitting a multicast control channel change notification to improve the efficiency of transmitting an MCCH change notification, to improve the reliability of transmitting the MCCH change notification over a PDCCH and to enable a user equipment to be indicated in time to receive modified contents over an MCCH.

An embodiment of the invention provides a method for receiving a Multicast Control Channel (MCCH) change notification, which includes:

acquiring transmission occasions of the MCCH change notification; and receiving the MCCH change notification for at least N times at the transmission occasions of the MCCH change notification if no MCCH change notification is received during an MCCH modification period, wherein N is a predetermined number of times that the MCCH change notification should be received.

An embodiment of the invention provides a user equipment including:

an occasion acquisition unit configured to acquire transmission occasions of an MCCH change notification; and a notification reception unit configured to receive the MCCH change notification for at least N times at the transmission occasions of the MCCH change notification if no MCCH change notification is received during an MCCH modification period, wherein N is a predetermined number of times that the MCCH change notification should be received.

An embodiment of the invention provides a method for transmitting a Multicast Control Channel (MCCH) change notification, which includes:

acquiring, by a base station, transmission occasions of the MCCH change notification; and transmitting the MCCH change notification for at least N times to a user equipment at the transmission occasions during an MCCH modification period, wherein N is a predetermined number of times that the MCCH change notification is transmitted.

An embodiment of the invention provides a device for transmitting a Multicast Control Channel (MCCH) change notification, which includes:

an occasion acquisition unit configured to acquire transmission occasions of the MCCH change notification; and a notification transmission unit configured to transmit the MCCH change notification for at least N times to a user equipment during an MCCH modification period at the transmission occasions acquired by the occasion acquisition unit, wherein N is a predetermined number of times that the MCCH change notification is transmitted.

The invention has at least the following advantages over the prior art.

In the embodiments of the invention, the base station and the user equipment acquire the same transmission occasions of the MCCH change notification, the base station transmits the MCCH change notification for at least N times to the user equipment at the occasions during an MCCH modification period, and the user equipment receives the MCCH change notification for at least N times at the occasions if no MCCH change notification is received during an MCCH modification period, thereby improving the efficiency of transmitting and receiving the MCCH change notification and lowering the probability that the user equipment fails to receive correctly the notification due to a poor channel condition or another reason; furthermore, the occasions can obviate paging occasions of the user equipment to thereby lower the probability that the MCCH change notification is processed in error due to an excessive number of network identifiers over the PDCCH.

DETAILED DESCRIPTION OF THE EMBODIMENTS

Technical solutions in embodiments of the invention will be described clearly and fully below with reference to the drawings in the embodiments of the invention, and apparently the described embodiments are merely a part of but not all the embodiments of the invention. All the other embodiments which will occur to those ordinarily skilled in the art based upon the described embodiments of the invention without any inventive effort shall come into the claimed scope of the invention.

In the embodiments of the invention, a base station and a user equipment establish a mode to acquire transmission occasions at which an MCCH change notification is transmitted over a PDCCH; and the user equipment receives the MCCH change notification transmitted from the base station for at least N times at the occasions and further acquires new information carried over an MCCH according to the MCCH change notification. Since the base station transmits the MCCH change notification over the PDCCH at the same occasions for all the user equipments, the base station can enable all the user equipments to acquire the MCCH change notification simply by transmitting the MCCH change notification for N times during an MCCH modification period without transmitting the MCCH change notification at paging occasions of the respective user equipments to thereby improve the efficiency of transmitting the MCCH change notification; furthermore, the transmission occasions of the MCCH change notification are acquired in the established acquisition mode, and the paging occasions of the user equipments can be obviated to thereby lower the probability that the MCCH change notification is processed in error due to an excessive number of network identifiers over the PDCCH.

In the embodiments of the invention, the base station may transmit, a notification period in which the MCCH change notification is transmitted over the PDCCH, a notification allocation offset and specific sub-frame positions at which the notification is transmitted, to the user equipment, and in turn the user equipment may calculate the transmission occasions of the MCCH change notification according to the received notification period and notification allocation offset, where the notification period or the notification allocation offset may be transmitted from the base station to the user equipment or calculated according to parameters determined directly in a system or a specification or parameters specified in another system. Furthermore, the base station may alternatively pre-establish with the user equipment the transmission occasions of the MCCH change notification and subsequently transmit the MCCH change notification at the established transmission occasions, and the user equipment may receive the MCCH change notification at the established transmission occasions.

Figure 1:
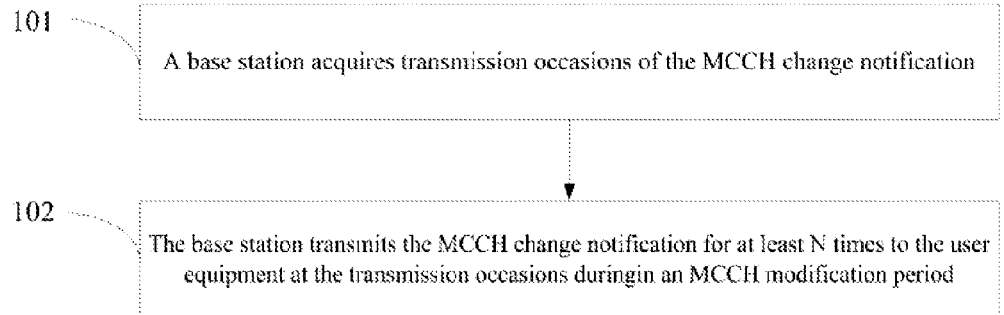
FIG. 1 is a schematic flow chart of a method for transmitting a multicast control channel change notification according to an embodiment of the invention.

An embodiment of the invention provides a method for transmitting a multicast control channel change notification, which as illustrated in FIG. 1 includes the following steps.

In the step 101, a base station acquires transmission occasions of the MCCH change notification.

The base station may pre-establish with a user equipment the transmission occasions of the MCCH change notification, and then the base station may simply transmit the MCCH change notification directly at the established transmission occasions; or the base station may firstly notify the user equipment about a notification period of the MCCH change notification, a notification allocation offset and specified sub-frame positions of a system frame at which the MCCH change notification is transmitted, and the user equipment may acquire the transmission occasions of the MCCH change notification according to the foregoing contents notified from the base station, where the sub-frame position may be a parameter issued from the base station to the UE or a parameter specified definitely in the system or may be derived in a system specified calculation method.

In the step 102, the base station transmits the MCCH change notification for at least N times to the user equipment at the transmission occasions during an MCCH modification period, where N is a predetermined number of times that the MCCH change notification is transmitted.

Figure 2:
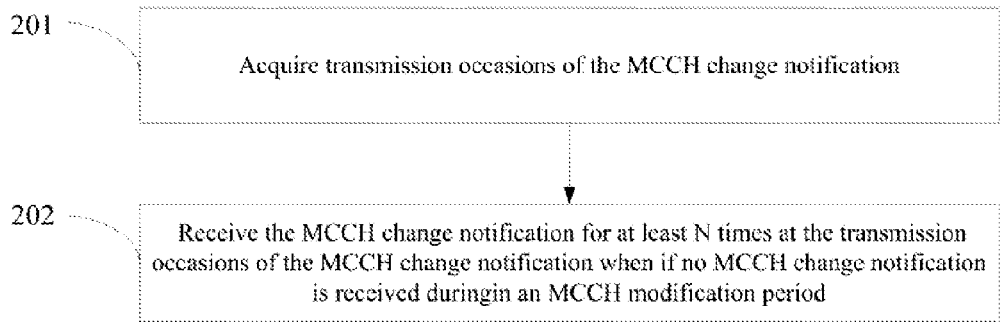
FIG. 2 is a schematic flow chart of a method for receiving a multicast control channel change notification according to an embodiment of the invention.

An embodiment of the invention provides a method for receiving a multicast control channel change notification, which as illustrated in FIG. 2 includes the following steps.

In the step 201, transmission occasions of the MCCH change notification are acquired.

A user equipment may pre-establish with a base station the transmission occasions of the MCCH change notification, and then the user equipment may simply receive the MCCH change notification directly at the established transmission occasions; or the user equipment may firstly receive a notification period of the MCCH change notification, a notification allocation offset and specified sub-frame positions of a system frame at which the MCCH change notification is transmitted, all of which are notified from the base station, and then acquire the transmission occasions of the MCCH change notification according to the foregoing contents notified from the base station, where the sub-frame position may be a parameter issued from the base station to the user equipment or a parameter specified definitely in the system or may be derived in a system specified calculation method.

In the step 202, the MCCH change notification is received for at least N times at the transmission occasions of the MCCH change notification if no MCCH change notification is received during an MCCH modification period.

In the embodiment of the invention, a specific value of N may be predetermined as needed in practice and, for example, may be set in the following way but will not be limited thereto:

N=the shortest MCCH modification period/the notification period of the MCCH change notification Where the notification period of the MCCH change notification is the shortest time interval during an MCCH modification period at which the MCCH change notification is transmitted repeatedly, and the shortest MCCH modification period is the shortest MCCH transmission period among a plurality of MBSFN areas covering the base station/cell.

The methods for transmitting and receiving a multicast control channel according to the embodiments of the invention will be introduced in details below in connection with the particular embodiments.

In the embodiments of the invention, the notification period notified from the base station to the user equipment may be set flexibly as needed in practice, and particularly when it has been specified in the system that the notification period of the MCCH change notification is equal to a paging period of the system or an MCCH modification period or a period specified in another system or a multiple thereof, then the user equipment and the base station acquire the notification period of the MCCH change notification as specified in the system, so this parameter of the notification period of the MCCH change notification may not necessarily be notified to the user equipment. The notification allocation offset may be set flexibly as needed in practice, for example, to 0, 1, or 2. When no notification allocation offset is set in the system, the system defaults this parameter to 0. In this application scenario, the base station may further notify the user equipment about a notification transmission window, which may also be referred to as a notification reception window, including a series of consecutive sub-frames, e.g., Multicast/Broadcast over Single Frequency Network (MBSFN) sub-frames, and the base station and the user equipment transmit and receive the MCCH change notification respectively in the sub-frames in the notification transmission window; and the base station and the user equipment calculate transmission occasions of the MCCH change notification in the notification period in an established acquisition mode and transmit and receive the MCCH change notification respectively at the occasions. The size of the notification transmission window is K, where a specific value of K is the number of sub-frames or MBSFN sub-frames in the notification transmission window and ranges from 1 to N.

Furthermore, the system specified sub-frame position at which the MCCH change notification is transmitted may be a parameter issued from the base station to the UE, or a parameter specified definitely in the system and understandable consistently to the base station and the user equipment according to the specification of the system, or may be derived in a system specified calculation method.

The mode to acquire the transmission occasions of the notification in the embodiment of the invention will vary with a relationship between the magnitudes of the notification period and a System Frame Number (SFN) cycle of the user equipment. Particularly the SFN ranges from 0 to 1023 representing 10 to 10240 ms, that is, the maximum system frame number (Max SFN) is 10.24 seconds, i.e., the length of the SFN cycle, and the notification period may be greater or less than the SFN cycle or the notification period may be equal to the SFN cycle.

Scenarios of the notification period being less than or equal to the Max SFN, i.e., the SFN cycle, will firstly be introduced below.

Figure 3:
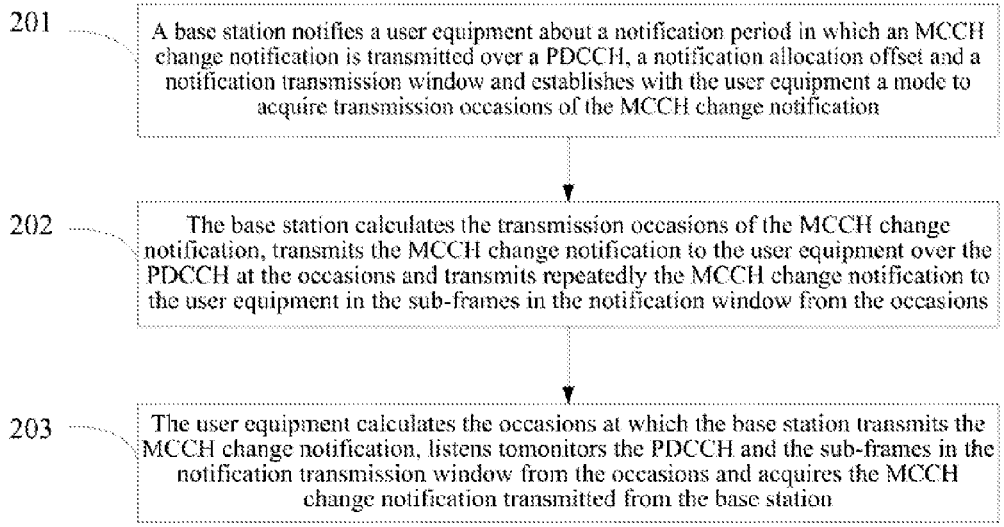
FIG. 3 is a schematic flow chart of acquiring an MCCH change notification by a user equipment according to an embodiment of the invention.
Figure 4:
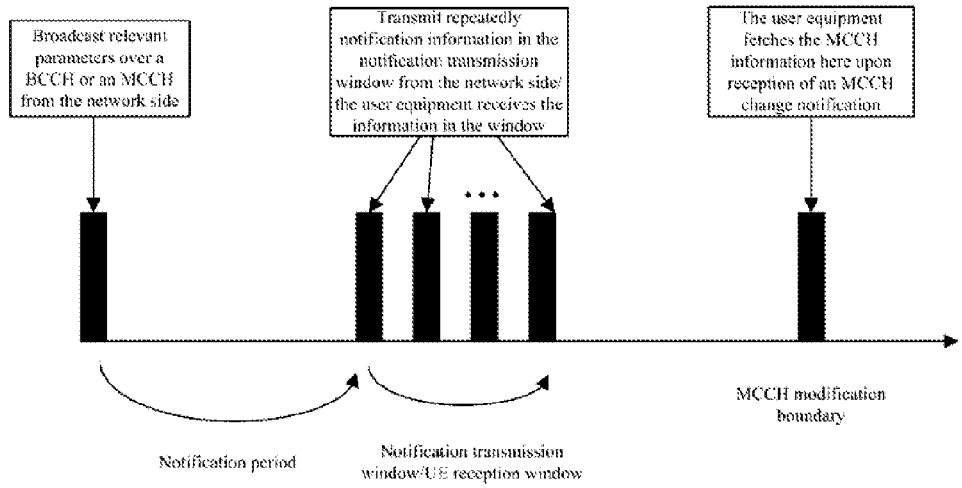
FIG. 4 is a schematic diagram of a mechanism for transmitting an MCCH change notification corresponding to FIG. 3.

In these scenarios, a user equipment may acquire an MCCH change notification in two modes, and an introduction will firstly be made below of a first mode which particularly as illustrated in FIG. 3 and FIG. 4 includes the following steps.

In the step 301, a base station notifies a user equipment about a notification period in which an MCCH change notification is transmitted over a PDCCH, a notification allocation offset and a notification transmission window and establishes with the user equipment a mode to acquire transmission occasions of the MCCH change notification.

Particularly the notification period is less than or equal to the Max SFN, and the transmission occasions of the MCCH change notification are acquired in the following mode:

$$\text{SFN Mod NotificationPeriod} = \text{NotificationAllocationOffset} \quad (1)$$

Where the SFN is a current system frame number, the NotificationPeriod is the notification period, and the NotificationAllocationOffset is the notification allocation offset defaulted to 0.

A sub-frame position specified with respect to the SFN satisfying the equation above is a transmission occasion of the MCCH change notification.

In the step 302, the base station calculates the transmission occasions of the MCCH change notification, transmits the MCCH change notification to the user equipment over the PDCCH at the occasions and transmits repeatedly the MCCH change notification to the user equipment in the sub-frames in the notification window starting from the occasions.

Specifically the base station calculates as in the equation (1) above, derives an occasion satisfying the equation (1) and the corresponding SFN, transmits the MCCH change notification over the PDCCH at the occasion and transmits repeatedly the MCCH change notification to the user equipment in the sub-frames in the notification transmission window. During an MCCH modification period, the base station transmits the MCCH change notification for at least N times to the user equipment in the notification transmission window according to the calculated transmission occasions at which the MCCH change notification is transmitted. The transmission occasion is a specified sub-frame position of the system frame, and a specific value of the size K of the notification transmission window is the number of sub-frames or MBSFN sub-frames in the notification transmission window and ranges from 1 to N.

In the step 303, the user equipment calculates as in the equation (1) the occasions at which the base station transmits the MCCH change notification, monitors the PDCCH and the sub-frames in the notification transmission window from the occasions and acquires the MCCH change notification transmitted from the base station.

Particularly the user equipment will not monitor any more other sub-frame in the notification transmission window once receiving the MCCH change notification transmitted from the base station correctly.

Figure 5:
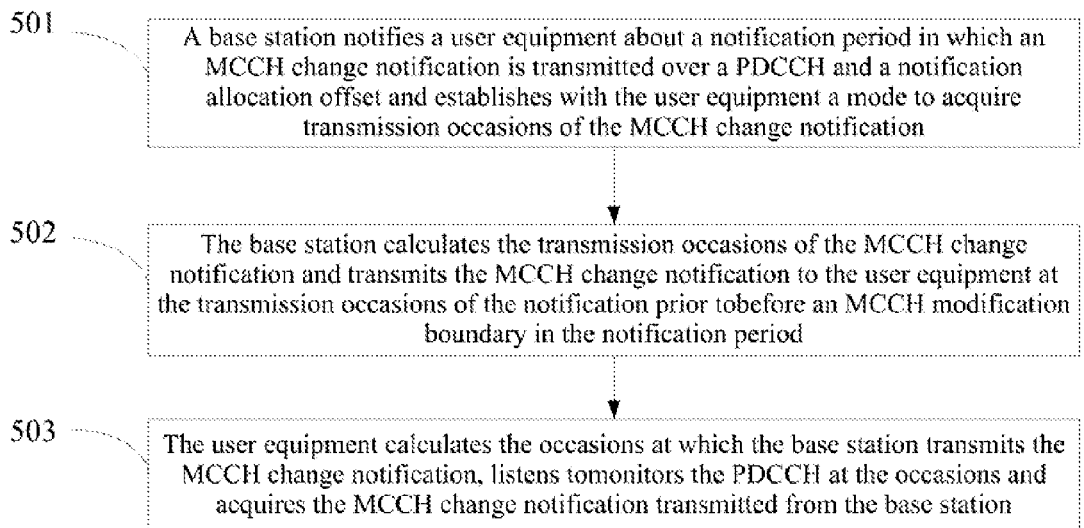
FIG. 5 is a schematic flow chart of acquiring an MCCH change notification by a user equipment according to an embodiment of the invention.
Figure 6:
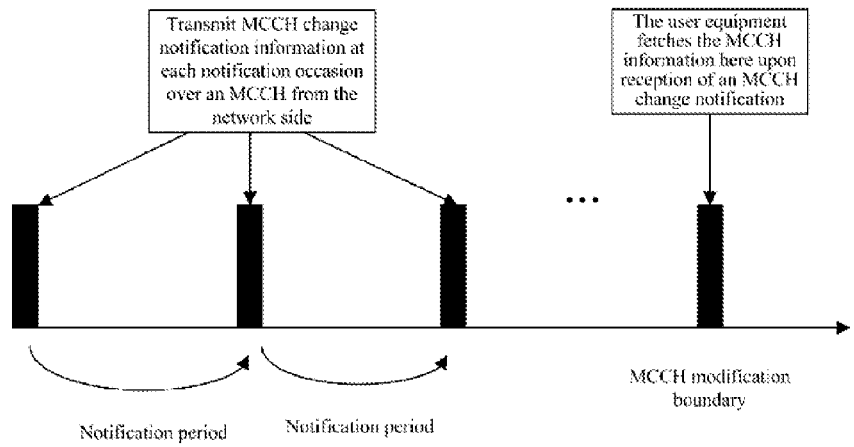
FIG. 6 is a schematic diagram of a mechanism for transmitting an MCCH change notification corresponding to FIG. 5.

A user equipment acquires an MCCH change notification in a second mode in a process as illustrated in FIG. 5 and FIG. 6 including the following steps.

In the step 501, a base station notifies a user equipment about a notification period in which an MCCH change notification is transmitted over a PDCCH and a notification allocation offset and establishes with the user equipment a mode to acquire transmission occasions of the MCCH change notification.

Particularly the transmission occasions of the MCCH change notification are acquired in the same mode as in the step 301:

$$\text{SFN Mod NotificationPeriod} = \text{NotificationAllocationOffset} \quad (1)$$

Where the SFN is a current system frame number, the NotificationPeriod is the notification period, and the NotificationAllocationOffset is the notification allocation offset defaulted to 0.

In the step 502, the base station calculates the transmission occasions of the MCCH change notification and transmits the MCCH change notification to the user equipment at the transmission occasions of the notification before an MCCH modification boundary in the notification period.

Particularly the next MCCH modification boundary refers to the boundary between the current MCCH modification period and the next MCCH modification period. The base station transmits the MCCH change notification once to the user equipment in each notification period. During an MCCH modification period, the base station transmits the MCCH change notification for at least N times to the user equipment at the calculated transmission occasions at which the MCCH change notification is transmitted, and a specific value of N is less than or equal to the number of transmission occasions of the notification before the next MCCH modification boundary.

In the step 503, the user equipment calculates as in the equation (1) the occasions at which the base station transmits the MCCH change notification, monitors the PDCCH at the occasions and acquires the MCCH change notification transmitted from the base station.

When the notification period is less than the Max SFN, the base station may transmit the MCCH change notification to the user equipment at a plurality of transmission occasions of the MCCH change notification before the next MCCH modification boundary. In this application scenario, the user equipment will not receive any more other MCCH change notification transmitted before the next MCCH modification boundary from the base station once receiving the MCCH change notification transmitted from the base station correctly.

Scenarios of a notification period being greater than the Max SFN, i.e., the SFN cycle, will be introduced below, and in these scenarios, a base station transmits a counter n or a counter m to a user equipment over an MCCH to assist the user equipment in locating correctly transmission occasions of an MCCH change notification, and the parameter n and the parameter m correspond to two modes in which the user equipment acquires the MCCH change notification, each of which will be introduced below.

Figure 7:
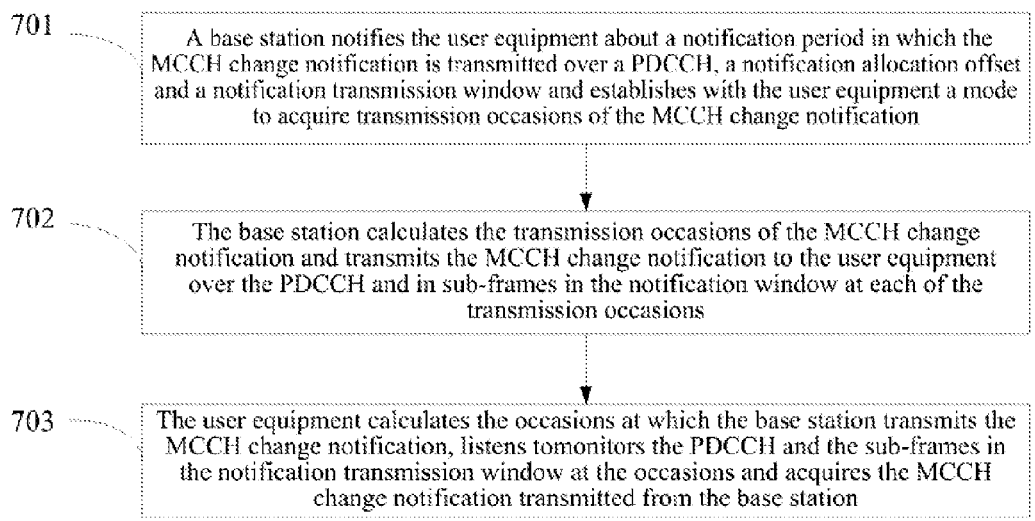
FIG. 7 is a schematic flow chart of acquiring an MCCH change notification by a user equipment according to an embodiment of the invention.
Figure 8:
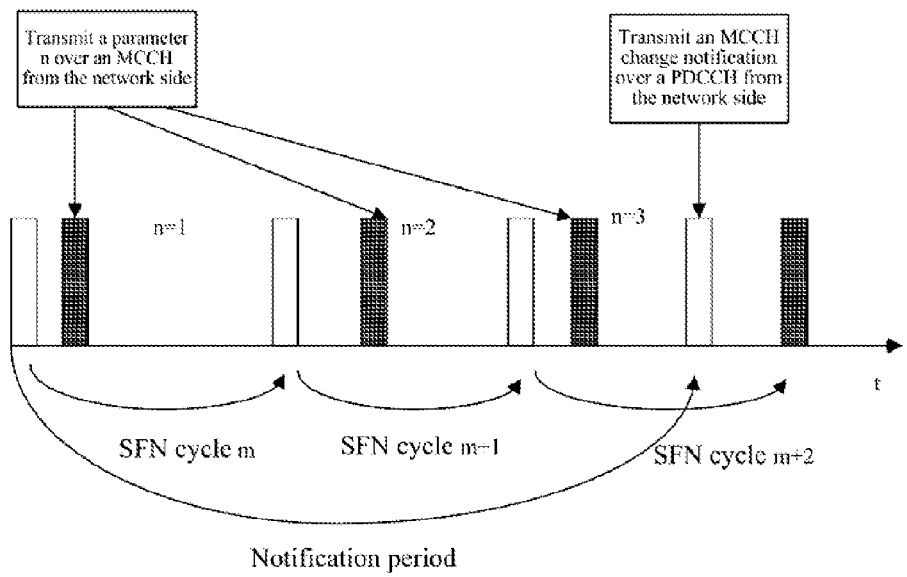
FIG. 8 is a schematic diagram of a mechanism for transmitting an MCCH change notification corresponding to FIG. 7.

In a first mode, a user equipment acquires an MCCH change notification in a process as illustrated in FIG. 7 and FIG. 8, where n is a scaling factor of a current SFN, which is a positive integer greater than or equal to 0 taking the following value:

n=1, 2, . . . , ⌈NotificationPeriod/MaxSFN⌉

Where $n_{max}$=⌈NotificationPeriod/MaxSFN⌉, referred to as the scaling factor of the maximum SFN, represents NotificationPeriod Mod MaxSFN.

Particularly the user equipment acquires the MCCH change notification in a process including the following steps.

In the step 701, a base station notifies the user equipment about a notification period in which the MCCH change notification is transmitted over a PDCCH, a notification allocation offset and a notification transmission window and establishes with the user equipment a mode to acquire transmission occasions of the MCCH change notification.

The transmission occasions of the MCCH change notification are acquired in the following mode:

$$(n*\text{MaxSFN}+\text{SFN})\bmod \text{NotificationPeriod}=\text{NotificationAllocationOffset} \quad (2)$$

As can be apparent from the introduction above, n is the scaling factor of the current SFN and incremented by 1 as each SFN cycle elapses, the NotificationPeriod is the notification period, and the NotificationAllocationOffset is the notification allocation offset.

In the step 702, the base station calculates the transmission occasions of the MCCH change notification by determining the times of system frames in SFN cycles with the SFN scaling factor n satisfying the equation (2) as the transmission occasions of the MCCH change notification and transmits the MCCH change notification to the user equipment over the PDCCH and in sub-frames in the notification window at each of the transmission occasions.

During an MCCH modification period, the base station transmits the MCCH change notification for at least N times to the user equipment at the calculated transmission occasions at which the MCCH change notification is transmitted. The transmission occasion is a specified sub-frame position of a system frame, and a specific value of the size K of the notification transmission window is the number of sub-frames or MBSFN sub-frames in the notification transmission window and ranges from 1 to N.

Particularly the base station calculates as in the equation (2) a plurality of occasions satisfying the equation (2), transmits the MCCH change notification to the user equipment over the PDCCH at each of the occasions satisfying the equation (2) and transmits repeatedly the MCCH change notification in each of the sub-frames or MBSFN sub-frames in the notification transmission window from the occasions.

In the step 703, the user equipment calculates as in the equation (2) the occasions at which the base station transmits the MCCH change notification, monitors the PDCCH and the sub-frames in the notification transmission window at the occasions and acquires the MCCH change notification transmitted from the base station.

After acquiring the occasions at which the base station transmits the MCCH change notification, the user equipment will update the value automatically as each SFN cycle elapses and monitor the transmitted notification at the occasion satisfying the equation (2). The user equipment will not monitor any more other sub-frame in the notification transmission window once receiving the MCCH change notification transmitted from the base station correctly as in the step 303.

Figure 9:
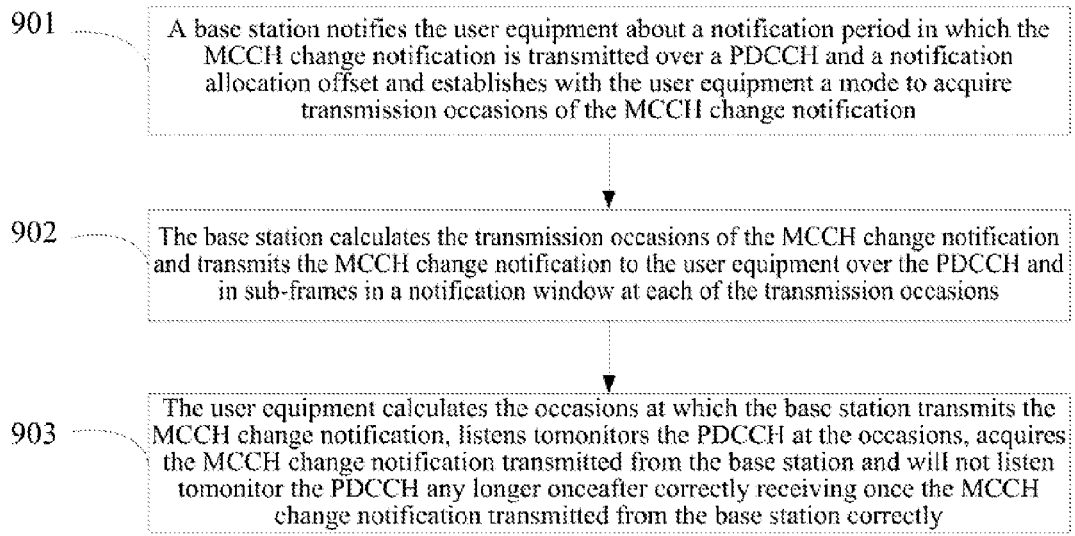
FIG. 9 is a schematic flow chart of acquiring an MCCH change notification by a user equipment according to an embodiment of the invention.
Figure 10:
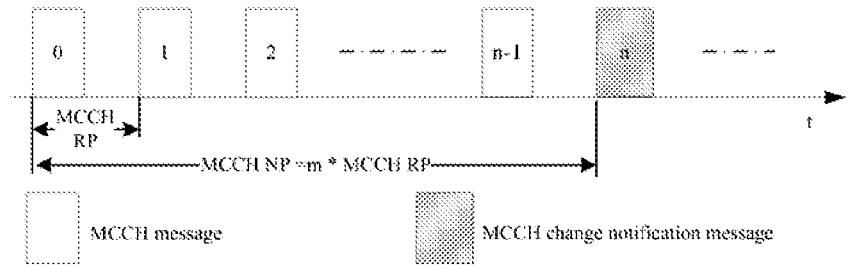
FIG. 10 is a schematic diagram of a mechanism for transmitting an MCCH change notification corresponding to FIG. 9.

In a second mode, m is an MCCH repetition period counter (McchRpCount), and as illustrated in FIG. 9 and FIG. 10, m is transmitted over the MCCH in each MCCH repetition period and is incremented by 1 upon each transmission thereof during an MCCH modification period.

The user equipment acquires the MCCH change notification in a process, as illustrated in FIG. 9, including the following steps.

In the step 901, a base station notifies the user equipment about a notification period in which the MCCH change notification is transmitted over a PDCCH and a notification allocation offset and establishes with the user equipment a mode to acquire transmission occasions of the MCCH change notification.

The transmission occasions of the MCCH change notification are acquired in the following mode:

$$m*\text{McchRepetitionPeriod} \bmod \text{McchNotificationPeriod}=\text{NotificationAllocationOffset} \quad (3)$$

In the step 902, the base station calculates the transmission occasions of the MCCH change notification by determining the times of system frames in the $m^{th}$ MCCH repetition periods satisfying the equation (3) as the transmission occasions of the MCCH change notification and transmits the MCCH change notification to the user equipment over the PDCCH and in sub-frames for transmitting the MCCH change notification at each of the transmission occasions.

During an MCCH modification period, the base station transmits the MCCH change notification for at least N times to the user equipment at the calculated transmission occasions at which the MCCH change notification is transmitted. A specific value of N is less than or equal to the number of transmission occasions of the notification before the next MCCH modification boundary.

In the step 903, the user equipment calculates as in the equation (3) the occasions at which the base station transmits the MCCH change notification, monitors the PDCCH at the occasions, acquires the MCCH change notification transmitted from the base station and will not monitor the PDCCH any longer once receiving the MCCH change notification transmitted from the base station correctly.

With the method according to the embodiments of the invention, the base station and the user equipment acquire the same transmission occasions of the MCCH change notification, the base station transmits the MCCH change notification for at least N times to the user equipment at the occasions during an MCCH modification period, and the user equipment receives the MCCH change notification for at least N times at the occasions if no MCCH change notification is received during an MCCH modification period, thereby improving the efficiency of transmitting and receiving the MCCH change notification and lowering the probability that the user equipment fails to receive correctly the notification due to a poor channel condition or another reason; furthermore, the occasions can obviate paging occasions of the user equipments to thereby lower the probability that the MCCH change notification is processed in error due to an excessive number of network identifiers over the PDCCH.

Figure 11:
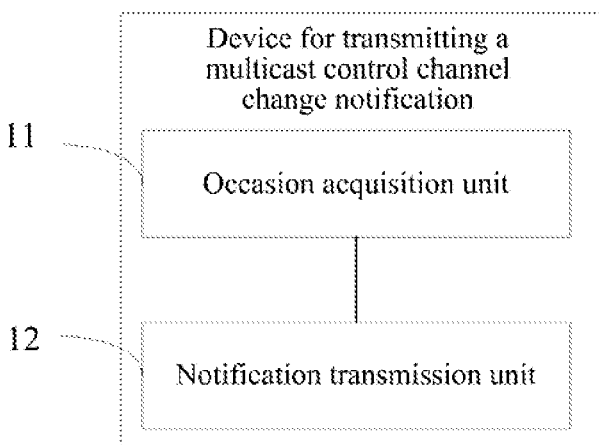
FIG. 11 is a schematic structural diagram of a device for transmitting a multicast control channel change notification according to an embodiment of the invention.

An embodiment of the invention provides a device for transmitting a Multicast Control Channel (MCCH) change notification which as illustrated in FIG. 11 includes:

an occasion acquisition unit 11 configured to acquire transmission occasions of an MCCH change notification; and a notification transmission unit 12 configured to transmit the MCCH change notification for at least N times to a user equipment at the transmission occasions acquired by the occasion acquisition unit during an MCCH modification period, where N is a predetermined number of times that the MCCH change notification is transmitted.

The occasion acquisition unit 11 is configured to acquire a notification period and a notification allocation offset of the MCCH change notification; and acquire the transmission occasions of the MCCH change notification according to a System Frame Number (SFN) and the acquired notification period and notification allocation offset.

When the notification period is less than or equal to the MaxSFN, the occasion acquisition unit 11 performs a modulo operation on the SFN and the notification period and acquires specified sub-frame positions of the system frame as the transmission occasions of the MCCH change notification when the result of the operation is equal to the notification allocation offset; and when the notification period is greater than the MaxSFN, the occasion acquisition unit 11 performs a modulo operation on the SFN and the notification period and acquires specified sub-frame positions of the system frames in SFN cycles with an SFN scaling factor n satisfying the equation of (n*MaxSFN+SFN)mod NotificationPeriod=NotificationAollcationOffset as the transmission occasions of the MCCH change notification.

The notification transmission unit 12 is configured to acquire one or more predetermined notification transmission windows and transmit the MCCH change notification for at least N times in sub-frames or Multicast/Broadcast over Single Frequency Network (MBSFN) sub-frames in the notification transmission window or windows from the specified sub-frame positions of the system frame, where a specific value of the size K of the notification transmission window is the number of sub-frames or MBSFN sub-frames in the notification transmission window and ranges from 1 to N.

The occasion acquisition unit 11 is further configured to perform a modulo operation on an MCCH repetition period and the notification period and acquire the starting time of the $m^{th}$ period satisfying the equation of (m*MCCHRepetitionPeriod)mod NotificationPeriod=NotificationAllocationOffset as the transmission occasion of the MCCH change notification, where m is a counter of MCCH repetition periods.

The notification transmission unit 12 is further configured to transmit the MCCH change notification over the PDCCH at least at N transmission occasions of the MCCH change notification before the next MCCH modification boundary, where a specific value of N is less than or equal to the number of transmission occasions of the MCCH change notification before the next MCCH modification boundary.

The value of N may be set in the following way but will not be limited thereto:

N=the shortest MCCH modification period/the notification period of the MCCH change notification Where the notification period of the MCCH change notification is the shortest time interval during an MCCH modification period at which the MCCH change notification is transmitted repeatedly, and the shortest MCCH modification period is the shortest MCCH transmission period among a plurality of MBSFN areas covering the base station/cell.

Figure 12:
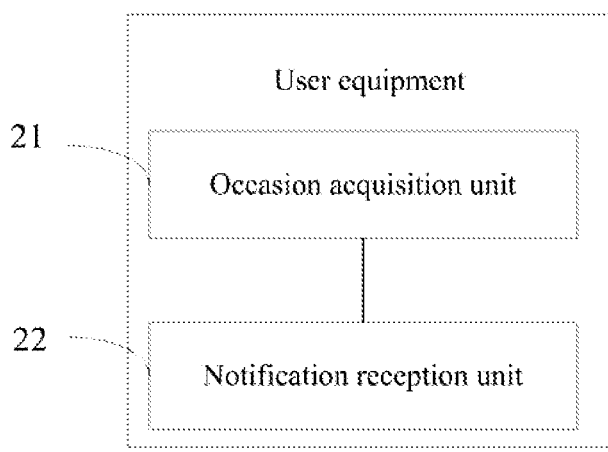
FIG. 12 is a schematic structural diagram of a user equipment according to an embodiment of the invention.

An embodiment of the invention provides a user equipment as illustrated in FIG. 12 including:

an occasion acquisition unit 21 configured to acquire transmission occasions of an MCCH change notification; and a notification reception unit 22 configured to receive the MCCH change notification for at least N times at the transmission occasions of the MCCH change notification if no MCCH change notification is received during an MCCH modification period, where N is a predetermined number of times that the MCCH change notification should be received.

The occasion acquisition unit 21 is configured to acquire a notification period and a notification allocation offset of the MCCH change notification; and acquire the transmission occasions of the MCCH change notification according to a System Frame Number (SFN) and the acquired notification period and notification allocation offset.

When the notification period is less than or equal to the MaxSFN, the occasion acquisition unit 21 performs a modulo operation on the SFN and the notification period and acquires specified sub-frame positions of the system frame as the transmission occasions of the MCCH change notification when the result of the operation is equal to the notification allocation offset; and when the notification period is greater than the MaxSFN, the occasion acquisition unit 21 performs a modulo operation on the SFN and the notification period and acquires specified sub-frame positions of the system frames in SFN cycles with an SFN scaling factor n satisfying the equation of (n*MaxSFN+SFN)mod NotificationPeriod=NotificationAollcationOffset as the transmission occasions of the MCCH change notification.

The notification reception unit 22 is configured to acquire at least one predetermined notification transmission window, monitor sub-frames or Multicast/Broadcast over Single Frequency Network (MBSFN) sub-frames in the notification transmission window from the specified sub-frame positions of the system frame and acquire the MCCH change notification transmitted from the base station; and to receive the MCCH change notification for at least N times in the notification transmission window if no MCCH change notification is received during an MCCH modification period, where a specific value of the size K of the notification transmission window is the number of sub-frames or MBSFN sub-frames in the notification transmission window and ranges from 1 to N.

The notification reception unit 22 is further configured to stop monitoring a PDCCH for a specific RNTI or M-RNTI in the sub-frames or the MBSFN sub-frames in the notification transmission window once receiving the MCCH change notification correctly.

The occasion acquisition unit 21 is configured to perform a modulo operation on an MCCH repetition period and the notification period and acquire the starting time of the $m^{th}$ repetition period satisfying the equation of (m*MCCHRepetitionPeriod)mod NotificationPeriod=NotificationAllocationOffset as the transmission occasion of the MCCH change notification, where m is a counter of MCCH repetition periods.

The notification reception unit 22 is further configured to monitor the PDCCH at least at N transmission occasions of the MCCH change notification before the next MCCH modification boundary and attempt to receive the MCCH change notification.

The notification reception unit 22 is further configured to stop monitoring the PDCCH for a specific RNTI or M-RNTI at the other transmission occasions of the notification before the next MCCH modification boundary once receiving the MCCH change notification correctly.

The value of N may be set in the following way but will not be limited thereto:

N=the shortest MCCH modification period/the notification period of the MCCH change notification Where the notification period of the MCCH change notification is the shortest time interval during an MCCH modification period at which the MCCH change notification is received repeatedly, and the shortest MCCH modification period is the shortest MCCH transmission period among a plurality of MBSFN areas covering the base station/cell.

With the device and the user equipment according to the embodiments of the invention, the base station and the user equipment acquire the same transmission occasions of the MCCH change notification, the base station transmits the MCCH change notification for at least N times to the user equipment at the occasions during an MCCH modification period, and the user equipment receives the MCCH change notification for at least N times at the occasions if no MCCH change notification is received during an MCCH modification period, thereby improving the efficiency of transmitting and receiving the MCCH change notification and lowering the probability that the user equipment fails to receive correctly the notification due to a poor channel condition or another reason; furthermore, the occasions can obviate paging occasions of the user equipments to thereby lower the probability that the MCCH change notification is processed in error due to an excessive number of network identifiers over the PDCCH.

From the foregoing description of the embodiments, those skilled in the art can understand clearly that the invention can be practiced in software plus a necessary general hardware platform and of course alternatively in hardware but the former implementation will be preferred in numerous scenarios. Based upon such understanding, the technical solution of the invention essentially or the part thereof contributing to the prior art can be embodied in the form of a software product which is stored in a storage medium and includes several instructions to cause a computer device (e.g., a personal computer, a server, or a network device) to perform the method according to the embodiments of the invention.

Those skilled in the art can appreciate that the drawings are merely schematic diagrams of preferred embodiments and the modules or the flows in the drawings may not necessarily be required to practice the invention.

Those skilled in the art can appreciate the modules in the device according to the embodiments can be distributed in the device of the embodiments as described in the embodiments or located in one or more other devices than the embodiments while being adapted correspondingly. The modules in the foregoing embodiments can be integrated into a module or further split into a plurality of sub-modules.

The serial numbers of the foregoing embodiments of the invention are merely for the sake of the description but will not indicate any precedence of one embodiment over the other.

The foregoing disclosure merely relates to several embodiments of the invention, but the invention will not be limited thereto, and any modifications which will occur to those skilled in the art shall come into the claimed scope of the invention.

What is claimed is:

1. A method for receiving a Multicast Control Channel, MCCH, change notification, comprising:

acquiring transmission occasions of the MCCH change notification, wherein the acquiring transmission occasions of the MCCH change notification comprises:

acquiring a notification period and a notification allocation offset of the MCCH change notification; and acquiring the transmission occasions of the MCCH change notification according to a System Frame Number, SFN, and the acquired notification period and notification allocation offset, wherein the acquiring the transmission occasions of the MCCH change notification according to the SFN and the acquired notification period and notification allocation offset comprises:

when the notification period is less than or equal to the Maximum System Frame Number, MaxSFN, performing a modulo operation on the SFN and the notification period and acquiring specified sub-frame positions of the system frame as the transmission occasions of the MCCH change notification when the result of the operation is equal to the notification allocation offset; and receiving the MCCH change notification for at least N times at the transmission occasions of the MCCH change notification if no MCCH change notification is received during an MCCH modification period, wherein N is a predetermined number of times that the MCCH change notification should be received.

2. The method according to claim 1, wherein the acquiring the transmission occasions of the MCCH change notification according to the SFN and the acquired notification period and notification allocation offset comprises:

when the notification period is greater than the MaxSFN, performing a modulo operation on the SFN and the notification period and acquires specified sub-frame positions of the system frames in SFN cycles with an SFN scaling factor n satisfying the equation of (n*MaxSFN+SFN) mod Notification Period= NotificationAollcationOffset as the transmission occasions of the MCCH change notification.

3. The method according to claim 2, wherein the receiving the MCCH change notification for at least N times at the transmission occasions of the MCCH change notification if no MCCH change notification is received during an MCCH modification period comprises:

acquiring at least one predetermined notification transmission window, monitoring sub-frames or Multicast/ Broadcast over Single Frequency Network, MBSFN, sub-frames in the notification transmission window from the specified sub-frame positions of the system frame or frames and acquiring the MCCH change notification transmitted from the base station; and receiving the MCCH change notification for at least N times in the notification transmission window if no MCCH change notification is received during an MCCH modification period, wherein a specific value of the size K of the notification transmission window is the number of sub-frames or MBSFN sub-frames in the notification transmission window and ranges from 1 to N.

4. The method according to claim 3, wherein the receiving the MCCH change notification for at least N times at the transmission occasions of the MCCH change notification comprises:

stopping monitoring a Physical Downlink Control Channel, PDCCH, for a specific Radio Network Temporary Identifier, RNTI, or Multimedia-Radio Network Temporary Identifier, M-RNTI, in the sub-frames or the MBSFN sub-frames in the notification transmission window once receiving the MCCH change notification correctly.

5. The method according to claim 1, wherein the acquiring transmission occasions of the MCCH change notification further comprises:
performing a modulo operation on an MCCH repetition period and the notification period and acquiring the starting time of an $m^{th}$ MCCH repetition period satisfying the equation of (m*MCCHRepetitionPeriod) mod NotificationPeriod=NotificationAllocationOffset as the transmission occasion of the MCCH change notification, wherein m is a counter of MCCH repetition periods.

6. The method according to claim 1, wherein the receiving the MCCH change notification for at least N times at the transmission occasions of the MCCH change notification comprises:
monitoring a Physical Downlink Control Channel, PDCCH, at least at N transmission occasions of the MCCH change notification before the next MCCH modification boundary and receiving the MCCH change notification.

7. The method according to claim 6, wherein the receiving the MCCH change notification for at least N times at the transmission occasions of the MCCH change notification further comprises:
stopping monitoring the PDCCH for a specific Radio Network Temporary Identifier, RNTI, or Multimedia-Radio Network Temporary Identifier, M-RNTI, at the other transmission occasions of the notification before the next MCCH modification boundary once receiving the MCCH change notification correctly.

8. The method according to claim 1, wherein the value of N is set to N=the shortest MCCH modification period/a notification period of the MCCH change notification, and
wherein the notification period of the MCCH change notification is the shortest time interval during an MCCH modification period at which the MCCH change notification is received repeatedly.

9. A user equipment, comprising:
an occasion acquisition unit configured to acquire transmission occasions of an MCCH change notification, wherein the occasion acquisition unit is configured to acquire a notification period and a notification allocation offset of the MCCH change notification and acquire the transmission occasions of the MCCH change notification according to a System Frame Number, SFN, and the acquired notification period and notification allocation offset and
wherein the occasion acquisition unit is configured to, when the notification period is less than or equal to the Maximum System Frame Number, MaxSFN, perform a modulo operation on the SFN and the notification period and acquire specified sub-frame positions of the system frame as the transmission occasions of the MCCH change notification when the result of the operation is equal to the notification allocation offset; and
a notification reception unit configured to receive the MCCH change notification for at least N times at the transmission occasions of the MCCH change notification if no MCCH change notification is received during an MCCH modification period, wherein N is a predetermined number of times that the MCCH change notification should be received.

10. The user equipment according to claim 9, wherein the occasion acquisition unit is configured to, when the notification period is greater than the MaxSFN, perform a modulo operation on the SFN and the notification period and acquire specified sub-frame positions of the system frames in SFN cycles with an SFN scaling factor n satisfying the equation of (n*MaxSFN+SFN) mod Notification Period=Notification-AollcationOffset as the transmission occasions of the MCCH change notification.

11. The user equipment according to claim 10, wherein the notification reception unit is configured to acquire at least one predetermined notification transmission window, monitor sub-frames or Multicast/Broadcast over Single Frequency Network (MBSFN) sub-frames in the notification transmission window from the specified sub-frame positions of the system frame or frames and acquire the MCCH change notification transmitted from the base station; and to receive the MCCH change notification for at least N times in the notification transmission window if no MCCH change notification is received during an MCCH modification period, wherein a specific value of the size K of the notification transmission window is the number of sub-frames or MBSFN sub-frames in the notification transmission window and ranges from 1 to N.

12. The user equipment according to claim 11, wherein the notification reception unit is further configured to stop monitoring a PDCCH for a specific RNTI or M-RNTI in the sub-frames or the MBSFN sub-frames in the notification transmission window once receiving the MCCH change notification correctly.

13. The user equipment according to claim 9, wherein the occasion acquisition unit is further configured to perform a modulo operation on an MCCH repetition period and the notification period and acquire the starting time of an $m^{th}$ MCCH repetition period satisfying the equation of (m*MCCH Repetition Period) mod NotificationPeriod=NotificationAllocationOffset as the transmission occasion of the MCCH change notification, wherein m is a counter of MCCH repetition periods.

14. The user equipment according to claim 9, wherein the notification reception unit is further configured to monitor a Physical Downlink Control Channel, PDCCH, at least at N transmission occasions of the MCCH change notification before the next MCCH modification boundary and receive the MCCH change notification.

15. The user equipment according to claim 9, wherein the value of N is set to N=the shortest MCCH modification period/a notification period of the MCCH change notification, and
wherein the notification period of the MCCH change notification is the shortest time interval during an MCCH modification period at which the MCCH change notification is received repeatedly.

16. A method for transmitting a Multicast Control Channel, MCCH, change notification, comprising:
acquiring, by a base station, transmission occasions of the MCCH change notification, wherein acquiring by the base station the transmission occasions of the MCCH change notification comprises:
acquiring, by the base station, a notification period and a notification allocation offset of the MCCH change notification; and
acquiring the transmission occasions of the MCCH change notification according to a System Frame Number, SFN, and the acquired notification period and notification allocation offset, and
wherein the acquiring the transmission occasions of the MCCH change notification according to the SFN and the acquired notification period and notification allocation offset comprises:
when the notification period is less than or equal to the Maximum System Frame Number, MaxSFN, performing, by the base station, a modulo operation on the SFN and the notification period and acquiring specified sub-frame positions of the system frame as the transmission occasions of the MCCH change notification when the result of the operation is equal to the notification allocation offset; and transmitting the MCCH change notification for at least N times to a user equipment at the transmission occasions during an MCCH modification period, wherein N is a predetermined number of times that the MCCH change notification is transmitted.

17. The method according to claim 16, wherein the acquiring the transmission occasions of the MCCH change notification according to the SFN and the acquired notification period and notification allocation offset comprises:

when the notification period is greater than the MaxSFN, performing, by the base station, a modulo operation on the SFN and the notification period and acquiring specified sub-frame positions of the system frames in SFN cycles with an SFN scaling factor n satisfying the equation of (n*MaxSFN+SFN) mod NotificationPeriod=NotificationAollcationOffset as the transmission occasions of the MCCH change notification.

18. The method according to claim 17, wherein the transmitting the MCCH change notification for at least N times to the user equipment at the transmission occasions during an MCCH modification period comprises:

acquiring, by the base station, one or more predetermined notification transmission windows and transmitting the MCCH change notification for at least N times in sub-frames or Multicast/Broadcast over Single Frequency Network, MBSFN, sub-frames in the notification transmission window or windows from the specified sub-frame positions of the system frame or frames, wherein a specific value of the size K of the notification transmission window is the number of sub-frames or MBSFN sub-frames in the notification transmission window and ranges from 1 to N.

19. The method according to claim 16, wherein acquiring by the base station the transmission occasions of the MCCH change notification further comprises:

performing, by the base station, a modulo operation on an MCCH repetition period and the notification period and acquiring the starting time of an $m^{th}$ MCCH repetition period satisfying the equation of (m*MCCH-RepetitionPeriod) mod NotificationPeriod=NotificationAllocationOffset as the transmission occasion of the MCCH change notification, wherein m is a counter of MCCH repetition periods.

20. The method according to claim 16, wherein the transmitting the MCCH change notification for at least N times to the user equipment at the transmission occasions during an MCCH modification period comprises:

transmitting, by the base station, the MCCH change notification over a Physical Downlink Control Channel, PDCCH, at least at N transmission occasions of the MCCH change notification before the next MCCH modification boundary, wherein a specific value of N is less than or equal to the number of transmission occasions of the MCCH change notification before the next MCCH modification boundary.

21. The method according to claim 16, wherein the value of N is set to N=the shortest MCCH modification period/a notification period of the MCCH change notification, and wherein the notification period of the MCCH change notification is the shortest time interval during an MCCH modification period at which the MCCH change notification is transmitted repeatedly.

22. A device for transmitting a Multicast Control Channel, MCCH, change notification, comprising:

an occasion acquisition unit configured to acquire transmission occasions of the MCCH change notification, wherein the occasion acquisition unit is configured to acquire a notification period and a notification allocation offset of the MCCH change notification and acquire the transmission occasions of the MCCH change notification according to a System Frame Number, SFN, and the acquired notification period and notification allocation offset, and wherein the occasion acquisition unit is configured to, when the notification period is less than or equal to the Maximum System Frame Number, MaxSFN, perform a modulo operation on the SFN and the notification period and acquire specified sub-frame positions of the system frame as the transmission occasions of the MCCH change notification when the result of the operation is equal to the notification allocation offset; and a notification transmission unit configured to transmit the MCCH change notification for at least N times to a user equipment during an MCCH modification period at the transmission occasions acquired by the occasion acquisition unit, wherein N is a predetermined number of times that the MCCH change notification is transmitted.

23. The device according to claim 22, wherein the occasion acquisition unit is configured to, when the notification period is larger than the MaxSFN, perform a modulo operation on the SFN and the notification period and acquire specified sub-frame positions of the system frames in SFN cycles with an SFN scaling factor n satisfying the equation of (n*MaxSFN+SFN) mod Notification Period=NotificationAollcationOffset as the transmission occasions of the MCCH change notification.

24. The device according to claim 23, wherein the notification transmission unit is configured to acquire one or more predetermined notification transmission windows and transmit the MCCH change notification for at least N times in sub-frames or Multicast/Broadcast over Single Frequency Network, MBSFN, sub-frames in the notification transmission window or windows from the specified sub-frame positions of the system frame or frames, wherein a specific value of the size K of the notification transmission window is the number of sub-frames or MBSFN sub-frames in the notification transmission window and ranges from 1 to N.

25. The device according to claim 22, wherein the occasion acquisition unit is further configured to perform a modulo operation on an MCCH repetition period and the notification period and acquire the starting time of an $m^{th}$ MCCH repetition period satisfying the equation of (m*MCCH-RepetitionPeriod) mod NotificationPeriod=NotificationAllocationOffset as the transmission occasion of the MCCH change notification, wherein m is a counter of MCCH repetition periods.

26. The device according to claim 22, wherein the notification transmission unit is configured to transmit the MCCH change notification over a Physical Downlink Control Channel, PDCCH, at least at N transmission occasions of the MCCH change notification before the next MCCH modification boundary, wherein a specific value of N is less than or equal to the number of transmission occasions of the MCCH change notification before the next MCCH modification boundary.

27. The device according to claim 22, wherein the value of N is set to N=the shortest MCCH modification period/a notification period of the MCCH change notification, and wherein the notification period of the MCCH change notification is the shortest time interval during an MCCH modification period at which the MCCH change notification is transmitted repeatedly.

* * * * *